Patented Mar. 5, 1946

2,396,219

UNITED STATES PATENT OFFICE 2,396,219

LUMINESCENT MARKING MATERIAL

Lawrence T. Weagle, Oakmont, Pa., assignor to Radio Corporation of America, a corporation of Delaware No Drawing. Application November 26, 1942, Serial No. 467,055

1 Claim. (Cl. 252—301.4)

My invention relates to luminescent marking materials, to their method of manufacture and more particularly to such materials incorporating luminescent sulphides.

Luminescent materials, particularly of the sulphide type such as zinc and cadmium sulphides, deteriorate very rapidly upon exposure at atmospheric conditions. While the exact decomposition reactions are not known, the decomposition is believed to be a photolytic process initiated by ultra violet light and continued as an electrolytic process in an adsorbed film of normal atmospheric moisture. The result of the decomposition is a blackening or darkening of the sulphide and it has been found that a specimen of zinc sulphide which is subjected to damp air will darken and lose its luminescent properties thousands of times more rapidly than a specimen which is placed in a desiccator. For example, a specimen of zinc sulphide wherein a portion of the zinc has been displaced with cadmium to form zinc-cadmium sulphide activated by copper and used as a luminescent material in an evacuated lamp shows appreciably no darkening following 2000 hours of exposure to ultra violet rays, whereas an identical specimen placed in air saturated with moisture becomes very dark and loses a great degree of its luminescence in one-half hour. Consequently, luminescent materials of the sulphide type, while ideally suitable for marking material use from the fluorescent and phosphorescent aspects, are subject to rapid deterioration.

Objects of my invention are to provide a stable base or carrier for luminescent marking materials; to provide a diluent for luminescent materials, particularly of the sulphide type, which acts simultaneously as a carrier and as a decomposition inhibiting means; to provide a luminescent sulphide containing marking material which is inherently stable when subjected to moisture, ultra violet light and atmospheric conditions in general; to provide a carrier for luminescent sulphides whereby the chain or electrolytic action which favors further decomposition of the sulphide is interrupted, and to provide a low-cost method of manufacturing luminescent marking materials which when subjected to normal atmospheric conditions are highly stable. These and other objects, features and advantages of my invention will be apparent when taken in connection with the following description inasmuch as a drawing is believed unnecessary for a full and complete understanding of my invention.

In accordance with my invention, I provide a carrier or base of hygroscopic material, and preferably incorporating a binder, with which the luminescent material is mechanically admixed, the mixture then being molded in any desired form for use as a marking means. Thus I have found, in accordance with my invention, that a material such as hemihydrated calcium sulphate having hygroscopic properties protects the luminescent material against darkening and consequent loss of luminescent properties. While I do not wish to be limited to any particular theory explaining this improved result, it is believed that the hygroscopic character of the hygroscopic material absorbs moisture and thereby fixes the moisture so that it has little or no effect upon the luminescent material associated with the hygroscopic carrier or diluent. I prefer to provide an aqueous mixture of the luminescent material with the hemihydrated calcium sulphate either with or without a water soluble binder such as polyvinyl alcohol which is then quickly formed into the desired shape so that it may set as a solid. During the setting process a portion of the hemihydrated material is converted to the dihydrated form which is in turn partially reconverted to the hemihydrated form by a baking or drying step. This may explain certain of the beneficial properties of my marking material in that it appears that even when only a minor portion of the material is hemihydrated the material has a greater affinity for atmospheric moisture which would otherwise cause deterioration of the luminescent material. Consequently, it would appear that when exposed to atmospheric conditions any water vapor present is bound by the calcium sulphate, rendering it ineffective in darkening or decomposing the sulphide luminescent material. Calcium sulphate is not greatly hygroscopic with respect to atmospheric moisture but rather hygroscopic to moisture from the luminescent material. It appears that such a material provides an interfacial absorption of the adsorbed moisture of the phosphor which is greater than the normal absorption of the moisture of the atmosphere. Consequently, excessive moisture is not drawn from the atmosphere by the desiccant. Thus any desiccant having a greater affinity for the adsorbed moisture of the luminescent material than that of the material for atmospheric moisture is suitable for practicing my invention. Such characteristics are possessed by calcium sulphate and calcium and magnesium carbonate and appear to be due to an interfacial phenomena occasioned by the proximity of the desiccant to, and the low surface tension of the moisture on, the luminescent material since moisture with the photolytic decomposition products has lower surface tension than pure water.

As a particular example in practicing my invention, I dry-mix a small quantity of the hemihydrated calcium sulphate with a larger quantity of finely divided or crystalline luminescent material such as 20 parts of the hemihydrate with 80 parts of the luminescent material by weight. I then dissolve, preferably in a separate container from that containing the dry-mix, a small amount of water-soluble binder such as medium viscosity of polyvinyl alcohol. The polyvinyl alcohol may be 2 parts to 98 parts water by weight. Other water-soluble or water-dispersible binders may be used such as dextrin or starch, although the percentage of such binding materials to the water is somewhat greater than that necessary with the polyvinyl alcohol binder, being from 5 to 10 per cent by weight. The purpose of this binder is to provide good adhesion both between the particles of luminescent material and between the particles of the desiccant, calcium sulphate. I have found that if such a binder is not used, the ratio of desiccant to luminescent material must be increased to a point at which the marking qualities of the product may be poor in that the material is too hard and the dilution too great for satisfactory use. Following the preparation of the dry-mix and the aqueous binder solution I dust a sufficient quantity of the dry-mix into the binder solution until the liquid is just absorbed. Following the dusting of the dry-mix into the binder solution I rapidly stir the materials to obtain a good mixture between the solid and liquid phase. Such stirring can be effected prior to the setting of the material, and I then immediately pour the mixed material into a positive mold. A further advantage of this method is that the mixture expands slightly upon setting and conforms to the outlines of the mold, providing a solid mass which is quite compact and smooth. After the mixture has set it is removed from the mold and dried at a relatively low temperature for a period of time such that a portion of the dihydrate reverts to the hemihydrate such as from 100 to 130° C.

I have found that less than 15 per cent of the desiccant such as calcium sulphate gives a friable product with insufficient strength for use as a marking material, whereas more than 30 per cent gives a product which is too hard for average use. I therefore prefer to use between 15 and 30 per cent of the hemihydrated calcium sulphate with respect to the total dry mixture of sulphate and luminescent material on a weight basis. In using other desiccants such as calcium or magnesium carbonate the preferred proportions are substantially the same as for calcium sulphate. The ratio of the dry-mix to the binder solution depends somewhat upon the particle size of the desiccant and luminescent material, although the procedure outlined above automatically compensates for these variables.

Various phosphors may be utilized in practicing my invention, the advantages thereof accruing especially in the use of zinc sulphide, cadmium sulphide and zinc-cadmium sulphide with or without the use of an activator such as silver, copper or gold. In addition, the particle size may vary over wide limits, being preferably less than 50 microns in diameter.

It will be appreciated from the above that I have provided a neutralizing ingredient homogenized with the luminescent material to assure stability during the time the marking material is subjected to atmospheric conditions whereby a high luminous efficiency of the material is assured until use. It will further be obvious that I have provided protection of the luminescent material from atmospheric moisture and human perspiration usually encountered during the use of such marking materials and that I have provided a mineral extender of low opacity to give good forming characteristics, adherence of the luminescent material to a writing surface, and a great reduction in cost both in the preparation and in the ingredients of my marking material. Thus while I have particularly pointed out the characteristics of my marking material constituents and their cooperative action, it will be appreciated that various equivalents may be used both in ingredients and mode of combination without departing from the spirit of my invention and the scope thereof as set forth in the appendel claim.

I claim:

A soft friable luminescent marking crayon comprising approximately 20 parts of hemihydrated calcium sulphate and 80 parts of luminescent material of the sulphide type held together with a water-soluble binder.

LAWRENCE T. WEAGLE.